United States Patent [19]

Tanigawa et al.

[11] Patent Number: 5,251,254
[45] Date of Patent: Oct. 5, 1993

[54] CONTROL OF INCOMING AND OUTGOING CALLS IN A KEY SYSTEM

[75] Inventors: Yoshihiro Tanigawa; Tsutomu Nishino, both of Yokohama; Shoichi Takashima, Tokyo, all of Japan

[73] Assignee: Canon Kabushiki Kaisha, Tokyo, Japan

[21] Appl. No.: 827,937

[22] Filed: Jan. 29, 1992

[30] Foreign Application Priority Data

Feb. 1, 1991 [JP] Japan .................................. 3-012093
Mar. 6, 1991 [JP] Japan .................................. 3-040117
Apr. 24, 1991 [JP] Japan .................................. 3-094381

[51] Int. Cl.⁵ .......................................... H04M 1/72
[52] U.S. Cl. ..................................... 379/165; 379/164
[58] Field of Search ................... 379/165, 164, 94, 93

[56] References Cited

U.S. PATENT DOCUMENTS 4,817,132  3/1989  Chamberlin et al. ............... 379/165
5,001,744  3/1991  Nishino et al. ........................ 379/93

Primary Examiner—S. D. Schreyer
Attorney, Agent, or Firm—Fitzpatrick, Cella, Harper & Scinto

[57] ABSTRACT

This invention relates to a communication apparatus which avoids interruption in the operation for an outgoing call of the first party from an extension telephone apparatus. In the case where there is conflict between an incoming call from the third party and an outgoing call from the first party in a selected unoccupied communication line, a call signal is transmitted to the all open extension telephone apparatus, at the same time, an other unoccupied communication line is automatically selected for the outgoing call. Accordingly, the conflict is avoided and the incoming call needs not be responded at the first party's telephone extension when a telephone number is being inputted, however, the fact that a call from the third party has been received is signaled on all open telephone extensions and can be answered there.

21 Claims, 13 Drawing Sheets

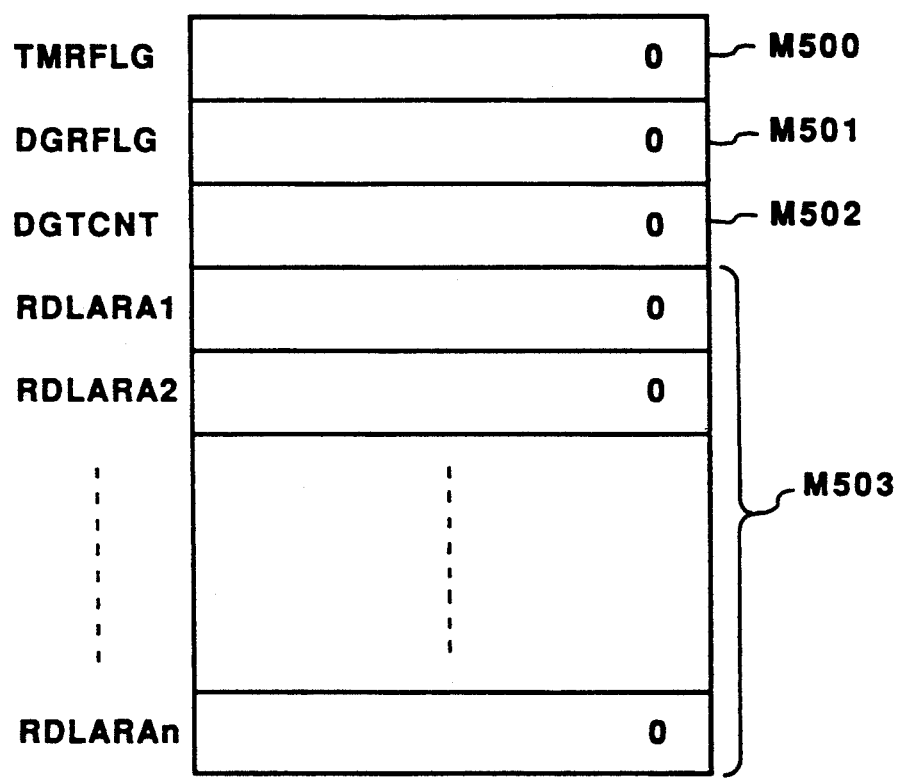
F I G. 9

CONTROL OF INCOMING AND OUTGOING CALLS IN A KEY SYSTEM

BACKGROUND OF THE INVENTION

1. Field of the Invention

The present invention relates to a communication apparatus accommodating a plurality of communication lines and terminal devices, capable of responding to an incoming and making an outgoing call to any desired person through the communication line.

2. Prior Art

In a conventional communication apparatus, i.e. a telephone exchange system, there are two options in the case where one makes a telephone call from an extension telephone: manual selection or automatic selection of the outside line. That is, a telephone user either one of plural outside line buttons and pushes it down, the user additionally dials "0" before the telephone number so that an unoccupied outside line is automatically selected or the unoccupied line is automatically selected when the handset is picked up.

In either manual or automatic selection, when there is a conflict between an incoming call and the outgoing call, the incoming call from the third party is given priority over the outgoing call to the second party. Therefore, in this case, there is the drawback that the first party must respond to the incoming call from the third party regardless of whether or not he/she wishes to. Accordingly, the third party who also could not speak with the desired person is displeased, while the first party who was going to make a telephone call from the extension telephone apparatus has to redial in order to call the second party. This is a troublesome operation and is another drawback in the conventional telephone exchange system.

Further, in a key telephone apparatus capable of accommodating a plurality of outside lines and extension telephones, the outside line buttons correspond exactly to each outside line channel, i.e., the outside line button 1 corresponds to channel B1 and the outside line button 2 to B2 of the ISDN (Integrated Services Digital Network).

However, there is another drawback in the above mentioned key telephone apparatus such that the outgoing call from the first party cannot go through from the outside line button 1 in the case where the incoming call from the third party is designated for channel B1. That is, when the outgoing call of the first party is made from the extension telephone apparatus, since the dial signal is transmitted after the telephone number is inputted and a start key is depressed, there is the drawback that the outgoing call from the first party is interrupted when the incoming call from the third party arrives while the telephone number is being inputted.

SUMMARY OF THE INVENTION

Accordingly, it is an object of the present invention to provide a communication apparatus capable of transmitting a call signal to other extension telephone apparatuses not in use and of automatically selecting an unoccupied line in the case where there is a conflict between the incoming call from the third party and the outgoing call from the first party.

According to the present invention, the foregoing object is attained by providing a communication apparatus accompanying a plurality of lines and a plurality of communication terminals, comprising:

storage means for storing statuses of occupancy in the communication lines, detection means for detecting the arrival of an incoming call in the communication lines, selection means for selecting an unoccupied line out of the plurality of lines by referring to the statuses of occupancy, and calling means for calling to the line selected by the selection means based on a request from the communication terminal, wherein the selection means selects an other unoccupied line and the calling means calls through an other unoccupied line, in the case where the detection means detects an incoming call on the line which was unoccupied and selected by said selection means.

It is another object of the present invention to provide a communication apparatus capable of avoiding the interruption of an outgoing call from the first party in a manner such that an incoming call from the third party is not responded by the first party when the telephone number which specifies the second party is being inputted.

According to the present invention, the foregoing object is attained by providing means for inputting the telephone number which specifies the second party, means for detecting an incoming call from the third party, and control means for controlling the extension telephone apparatus not to respond to the incoming call from the third party, in the case where the telephone number is being inputted by the first party.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute part of the specification, illustrate embodiments of the invention and, together with the description, serve to explain the principles of the invention. In the drawings:

FIG. 9 is a view which illustrates the constitution of data in a RAM; and

DESCRIPTION OF THE PREFERRED EMBODIMENTS

The preferred embodiments of the present invention will now be described in detail in accordance with the accompanying drawings.

First Embodiment

Figure 1:
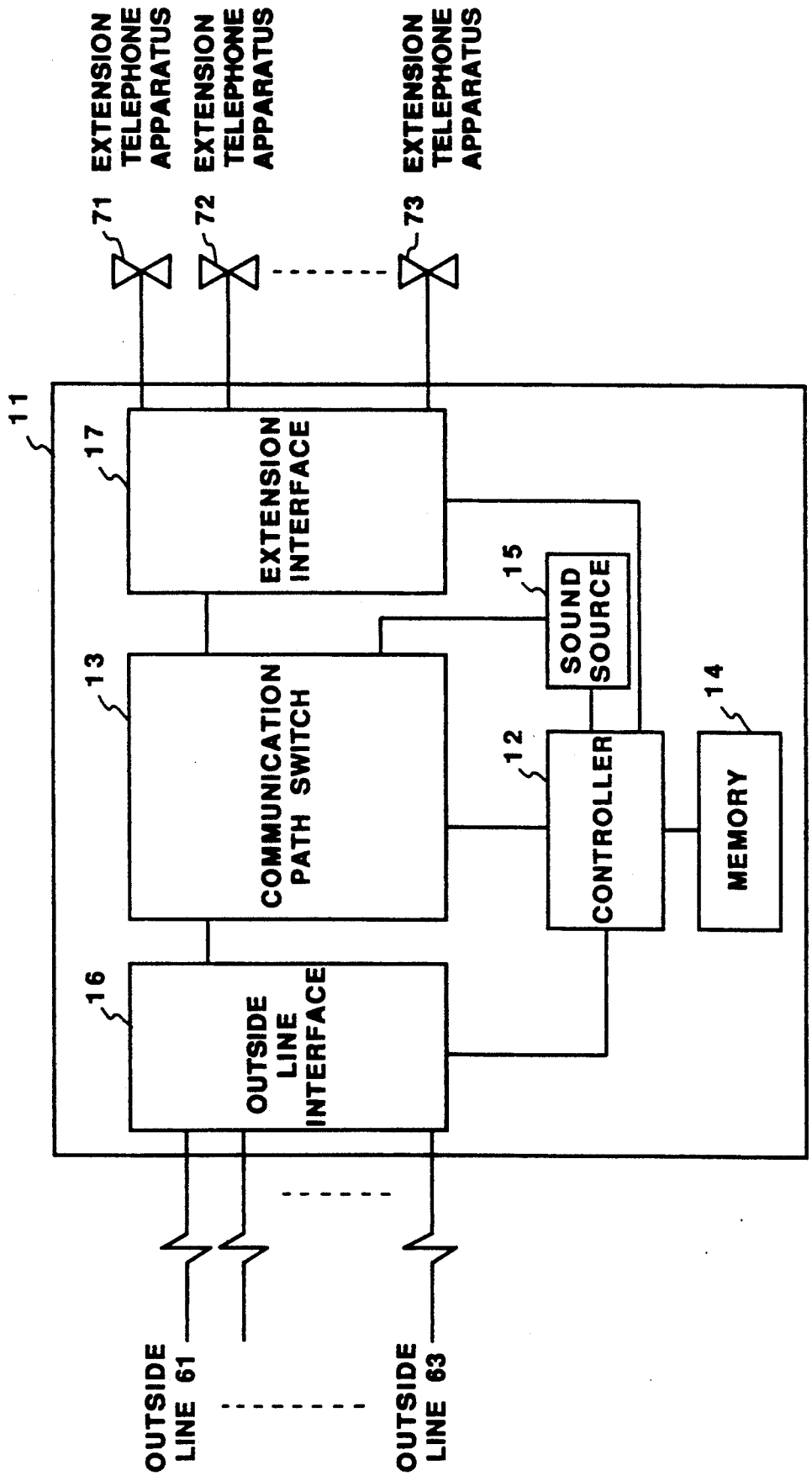
FIG. 1 is a block diagram of the telephone exchange system in broad outline according to the first embodiment.

FIG. 1 is a block diagram of the telephone exchange system in broad outline according to the present invention. In the diagram, the reference numeral 11 is the telephone exchange system and the reference numeral 12 is the controller which controls the whole of telephone exchange system 11 including "outgoing call" control in the case of a conflict between an incoming call from the third party and an outgoing call from the first party (to be described later). The reference numeral 13 is a communication path switch which forms a communication path between the outside lines 61–63, connected to the outside line interface 16, and the extension telephones 71–73, connected to the extension interface. This communication path is either connected or cut off by the communication path switch 13.

The reference numeral 14 refers to memory which stores system set data, abbreviated number data, one-touch dial data, and the like for each extension telephone apparatus. The reference numeral 15 is a sound source which generates a dial tone, a multi-frequency call signal, a call signal, and the like. The reference numeral 16 is the outside line interface which manages the outside lines 61–63 connected to a public switched telephone network (not indicated in FIG. 1) and the reference numeral 17 is the extension interface which manages the extension telephone apparatuses 71–73 of the telephone exchange system.

Figure 2:
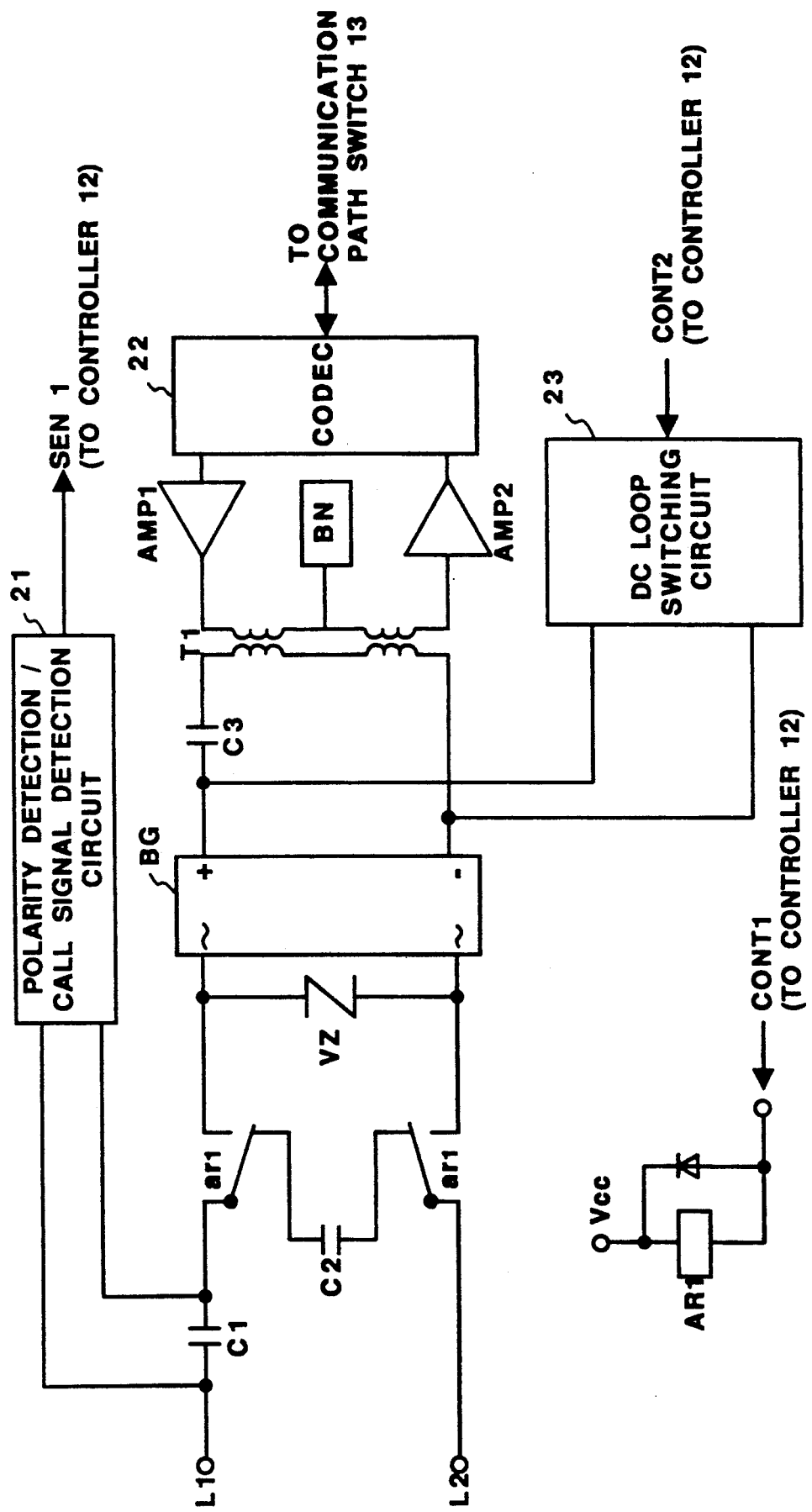
FIG. 2 is a detailed block diagram which illustrates one of a plurality of outside lines comprising the outside line interface according to the first embodiment.

FIG. 2 is a detailed block diagram which illustrates one of the plurality of outside lines constituting the outside line interface 16 shown in FIG. 1. The reference L1 and L2 are input/output terminals of the outside lines which are connected to the public network and the reference numeral 21 is a polarity detection/call signal detection circuit which detects polarities of the telephone communication lines, that is, polarities of the L1 and the L2, and call signals from the telephone communication lines. The detected signals are outputted to the controller 12 through a SEN 1.

The reference ar 1 is a relay contact of the relay AR 1 in which switching is controlled by the controller 12 through the CONT 1. The reference VZ is a varistor which protects the circuits against surge voltage which comes from the outside. The reference BG is a diode bridge circuit, the reference T1 is a transformer which performs two-wire/four-wire conversion to the telephone communication lines L1 and L2, the reference BN is a balancing network circuit for impedance matching, and the references AMP 1 and AMP 2 are amplifier circuits which amplify a voice signal. Furthermore, the reference numeral 22 is a voice codec which performs the conversions of A/D and D/A (analog/digital and digital/analog) of analog signals and digital signals, and the reference numeral 23 is a DC loop switching circuit which forms a DC loop of the communication lines L1 and L2 and is controlled by the controller 12 through the CONT 2 for the purpose of generating dial pulses.

Figure 3A:
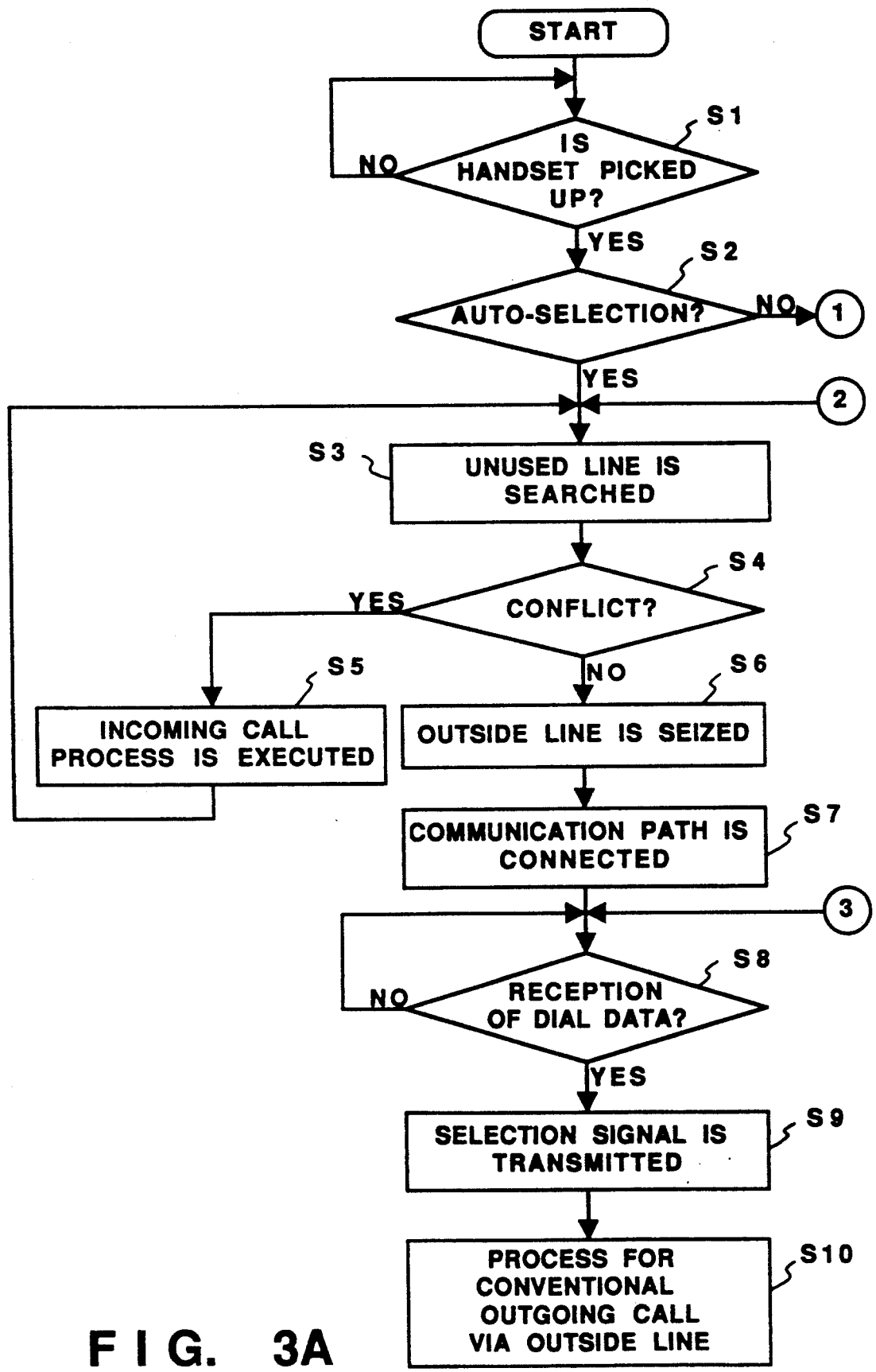
FIG. 3A and FIG. 3B are flowcharts which illustrate an operation in a controller of the system according to the first embodiment.
Figure 3B:
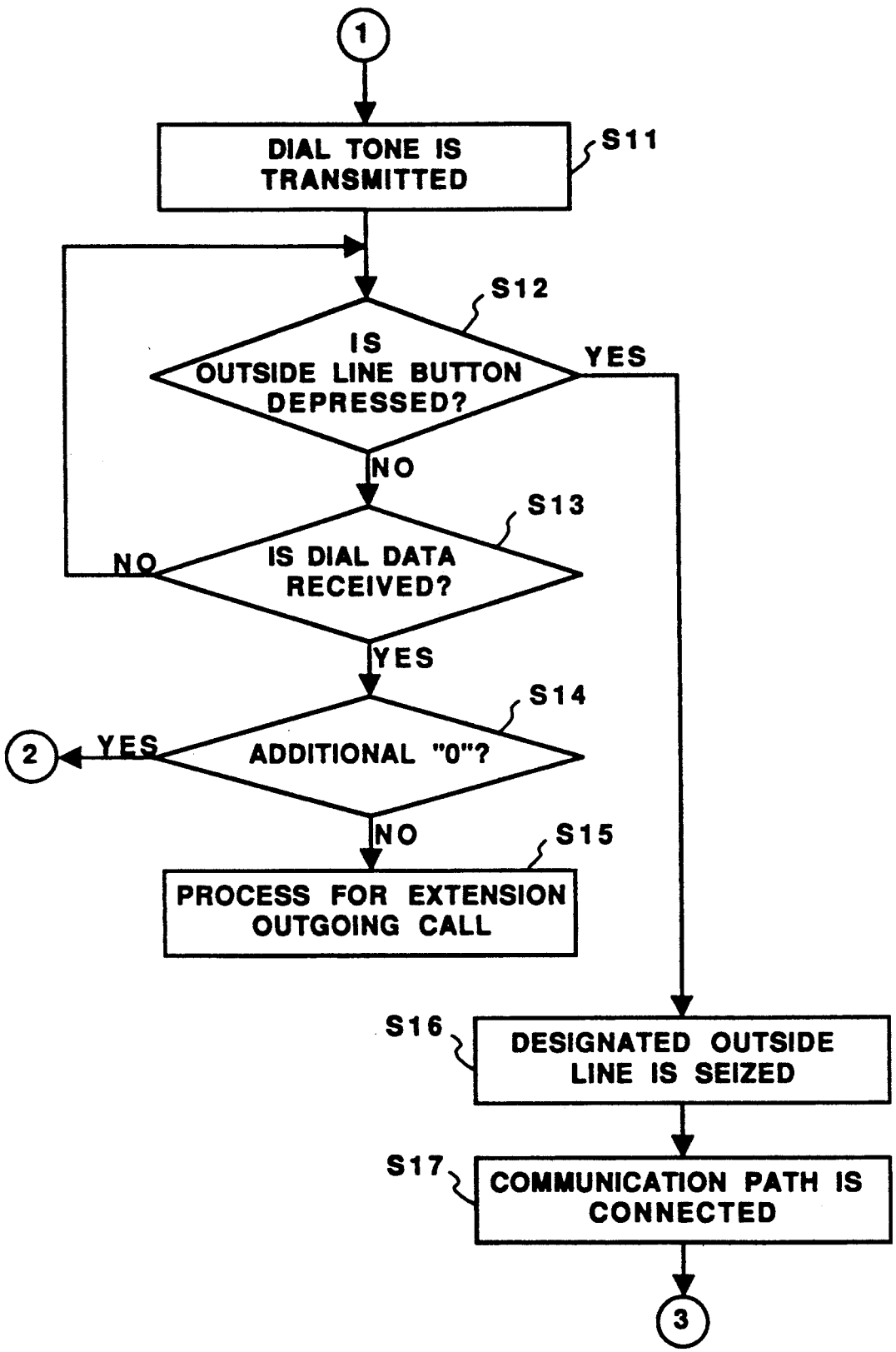

The flowcharts in FIG. 3A and FIG. 3B show the operation of the telephone exchange system described above according to the present embodiment.

In step S1, the controller 12 recognizes that a handset of the extension telephone apparatus 71 is picked up, and in step S2, the controller 12 discriminates whether or not an automatic line selection data is set for the system. If it is set, the process proceeds to step S3 and, in the rest of cases, the process proceeds to step S11. In step S3, it is diagnosed whether the outside lines are occupied in the descent order (from 63 to 61), and referring to the memory 14 and as a result an unoccupied line is selected.

Then, in step S4, the controller 12 discriminates whether a polarity reversal or a call signal in the telephone communication lines L1 and L2 is detected by the SEN 1 and the polarity detection/call signal detection circuit 21 in FIG. 2. More particularly, the polarity reversal is discriminated in a manner such that the polarity of the telephone communication lines L1 and L2 when the telephone exchange system is set up is stored in the memory 14 through the polarity detection circuit 21 and the SEN 1 in advance. The stored polarity is compared with a result of the detection in the polarity detection circuit 21. Furthermore, a call signal is detected by determining whether or not a status of the SEN 1 changes corresponding to the 16 Hz frequency of the call signal. In the case where the polarity reversal or the call signal is detected, that is, a conflict between the incoming call and the outgoing call occurred, the process proceeds to step S5. On the other hand, in the case where none of these is detected, the process proceeds to step S6.

In step S5, the controller 12 starts the processes for the incoming call such as setting the outside line to "being used" in the memory 14 and transmitting a call signal from the sound source 15 to the extension telephone apparatuses except the ones being used (including the extension telephone 71 in the present embodiment) through the communication path switch 13 and the extension interface 17, furthermore, lighting a lamp of all extension telephone apparatuses which indicates the arrival of the incoming call. After that, the process returns to step S3 where an unoccupied line is selected and the process again proceeds to step S4 where it is discriminated if a conflict has occurred.

In the case where there is no conflict detected, the process proceeds to step S6 where an unoccupied line is seized, the relay AR 1 is activated through the CONT 1 of the outside line interface 16, the relay AR 1 is activated connecting the outside line and a DC loop of the telephone communication line is formed by the DC loop switch circuit 23. Then, in step S7, the controller 12 connects the extension telephone apparatus 71 and the outside line by controlling the communication path switch 13 as well as the controller sets the status of the outside line to "being used" in the memory 14. As a result, a dial tone can be heard from the public telephone line in the telephone apparatus 71. Furthermore, the controller 12 lights each lamp corresponding to all extension telephone apparatuses which indicates that the extension telephone apparatus 71 is "being used."

In step S8, whether or not the telephone number is fully inputted from the extension telephone apparatus 71 is determined. Once the controller 12 receives the telephone number, it activates the sound source 15 depending on the received dial data and generates a multi-frequency call signal as a selection signal. Then, the communication path switch 13 is turned on to transmit the call signal to the extension telephone apparatus 71. The DC loop switching circuit 23 and the CONT 2 are controlled based on the received dial data. Then, the selection signal is transmitted to the telephone communication lines L1 and L2 after the DC loop via L1 and L2 is formed. Then, the process proceeds to step S10 where conventional processes such as detecting if the outgoing call is received and connecting the communication path are performed.

On the other hand, in step S2, if the controller 12 discriminates the automatic line selection data, the process proceeds to step S11 where a dial tone is transmitted from the sound resource 15 to the extension telephone apparatus 71 through the communication path switch 13 and the extension interface 17. In step S12, whether or not the outside line button has been depressed is determined, and in step S13, whether or not the telephone number is fully inputted is determined. In the case where the controller 12 receives data indicating the depression of the outside line button, the process proceeds to step 16 where an outside line is seized in a manner such that the outside line interface 16 is activated as in step S6 as well as the status of the outside line is set to "being used" in the memory 14. Then, an outside line lamp corresponding to the outside line of all the extension telephone apparatuses is lit to indicate that the outside line is "being used." Then, the process proceeds to step S17 where the communication path switch 13 is controlled to connect the outside and the extension line. The process, then, proceeds to S8 and the above described process is repeated.

When the telephone number is received in step S13, it is discriminated as to whether or not the received data indicates to select an unoccupied line automatically, that is, if the received data includes the additional (special) number "0." If the additional number "0" is included, the process proceeds to step S3. On the other hand, if the additional number "0" is not included, the process proceeds to step S15.

As described above, according to the present embodiment, after the unoccupied line is automatically selected for the outgoing call from the extension telephone apparatus, it is diagnosed if there is any conflict on the selected outside line before seizing that line. Then, in the case where a conflict has occurred, an incoming call processing such as transmitting the call signal to all the open telephone extensions is performed. At the same time, another unoccupied outside line is again automatically selected and the outgoing call is made from the extension telephone apparatus using that line.

According to the present embodiment, even when a conflict between the incoming call and the outgoing call has occurred, the incoming call is normally responded by an unoccupied extension telephone apparatus in a manner such that all open telephone extensions are signaled.

In other words, in the case where an unoccupied line is selected from the extension telephone apparatus and a conflict has occurred in the selected line, another unoccupied line is selected. Accordingly, it is possible to solve the problem of which the first party must respond to the incoming call from the third party regardless of his/her intention and speak with an unexpected person and the third party who also could not speak with the desired person is displeased. In addition, it is possible to provide a telephone exchange system in which the operation for an outgoing call to the second party, even a conflict occurs, becomes simple because the first party making a telephone call from the extension telephone apparatus does not have to respond to the unexpected third party and then to call the second party again.

Second Embodiment

Figure 4:
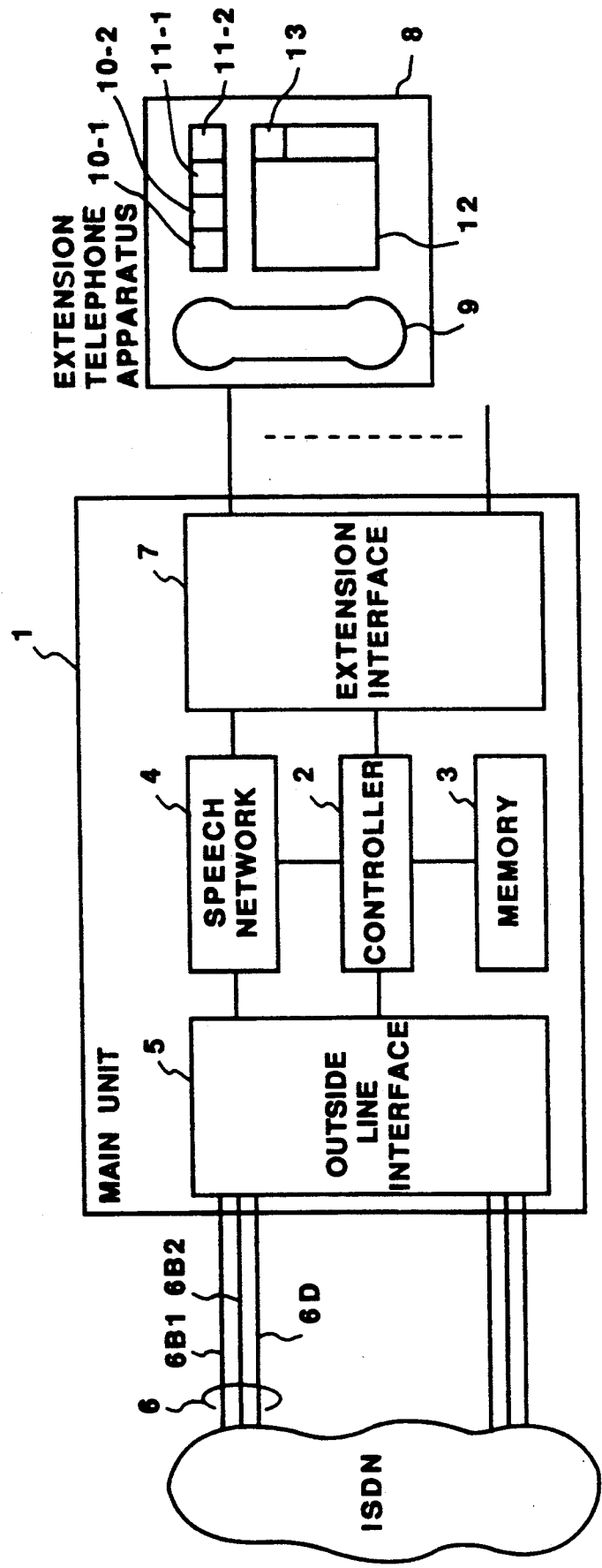
FIG. 4 is a diagram which illustrates the constitution of a key telephone apparatus according to the second embodiment.

FIG. 4 is a diagram which illustrates the constitution of the key telephone apparatus according to the second embodiment. In the drawing, the reference numeral 1 is a main unit of the telephone apparatus, the reference numeral 2 is a controller which controls the whole system, and the reference numeral 3 is a memory which stores the statuses of the outside and the extension lines. The reference numeral 4 is a speech network which connects the communication path between the outside and the extension lines and between the extension and the other extension lines. The reference numeral 5 is an outside line interface which transmits and receives call control information to and from the ISDN (Integrated Services Digital Network) and the reference numeral 6 represents the outside lines which are connected to the ISDN. The reference 6B1, 6B2, and 6D are the outside lines which are logically corresponding to channel B1, channel B2, and channel D respectively. The reference numeral 7 is the extension interface which communicates with the extension telephone apparatuses, the reference numeral 8 is an extension telephone apparatus, and the reference numeral 9 is the handset. The reference numerals 10 and 11 are the outside line buttons and each pair of these corresponds to one outside line (i.e., the outside line buttons 10-1 and 10-2 correspond to outside line 6). The reference numeral 12 represents the dial buttons and the reference numeral 13 is the start button which indicates the completion of the dial input.

Figure 5:
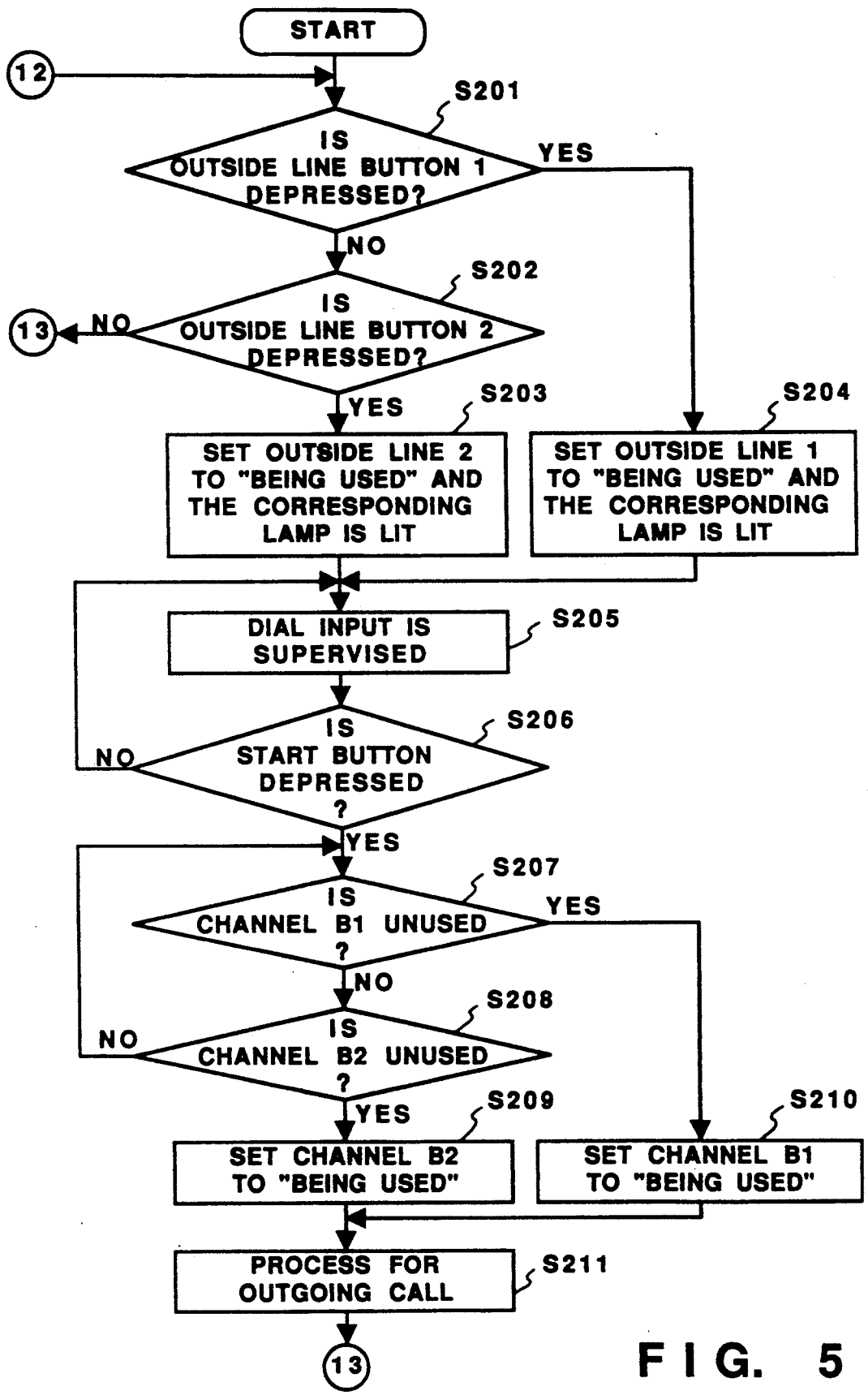
FIG. 5 and FIG. 6 are flowcharts which illustrate an operation in the controller of the apparatus according to the second embodiment.
Figure 6:
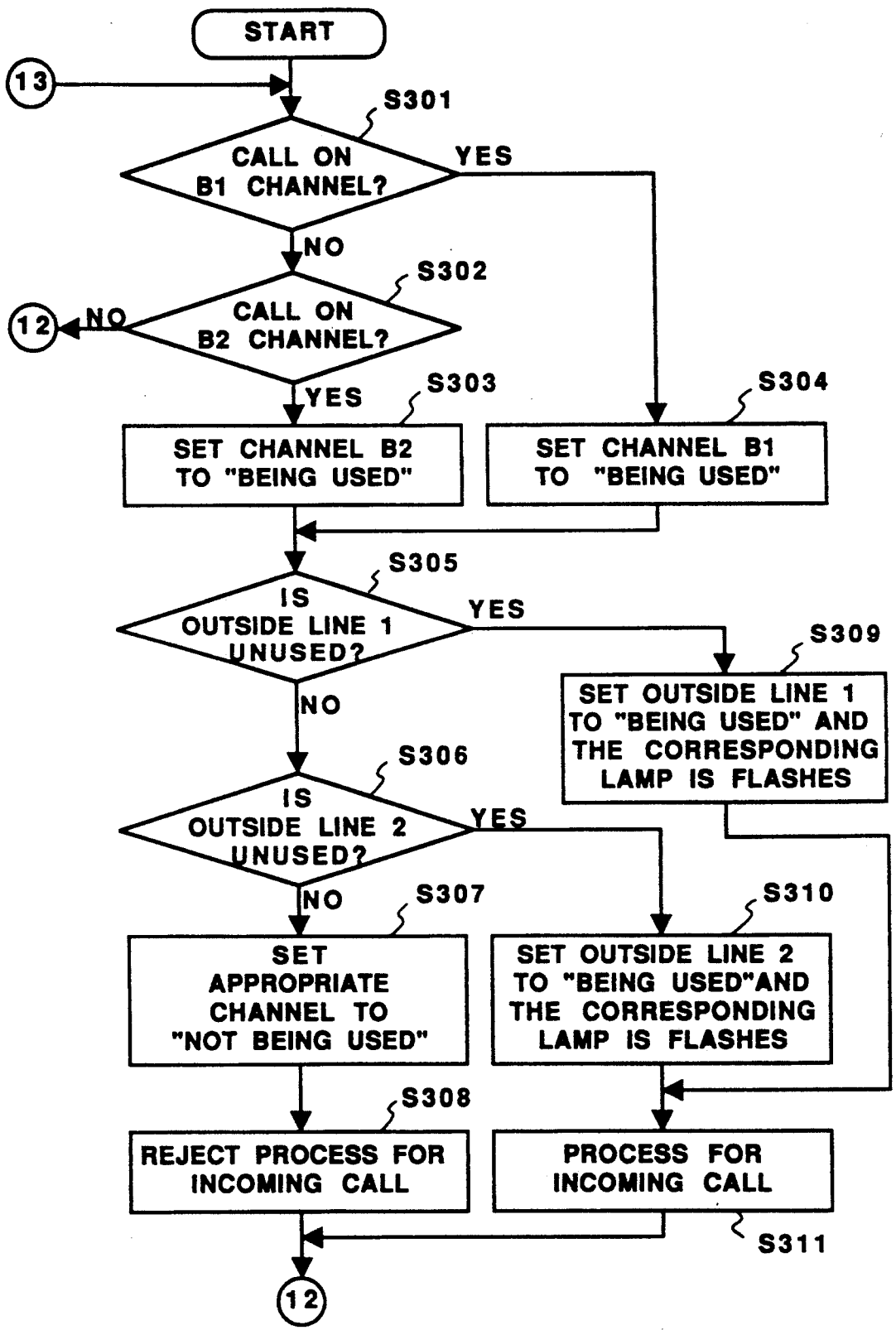

FIG. 5 and FIG. 6 are flowcharts which illustrate the operations of controller 2 of the system according to the second embodiment. FIG. 5 is a flowchart which illustrates the operation of the controller 2 in the case of an outgoing call and FIG. 6 is a flowchart in the case of an incoming call.

Accompanying these drawings, the operations in the case of an outgoing call or an incoming call are now described. In FIG. 5, the controller 2 supervises the outside line button 10 (in steps S201 and 202). In the case where the outside line button 10-1 is depressed, a state of occupancy of the outside line button 10-1 is set to "being used" in memory 3 and the lamp of the outside line button 10-1 in each extension telephone apparatus is lit (in step S204). On the other hand, in the case where the outside line button 10-2 is depressed, a state of occupancy of the outside line button 10-2 is set to "being used" in memory 3 and the lamp of the outside line button 10-2 in each extension telephone apparatus is lit (in step S203).

Then, the controller 2 supervises the dial input and the memory 3 stores the dialed number until the start button 13 is depressed.

When the fact that the start button 13 has been pushed down is detected (in step S206), the state of occupancy in the channel corresponding to the outside line 6 is recognized (in steps S207 and S208) in memory 3 and the state of the channel which was unoccupied is set to "being used" (in steps S209 and S210). Then, the outside line interface 5 is activated and the process for the outgoing call on the corresponding channel based on the inputted telephone number is performed (in step S211).

For an incoming call, in FIG. 6, the controller 2 supervises the incoming call from the outside line 6 through the outside line interface 5 (in steps S301 and S302). In this case, the state of the corresponding channel is set to "being used" in the memory 3 (in steps S303 and S304).

The controller 2 discriminates the state of occupancy of the outside line button 10 in the memory 3 (in steps S305 and S306), and then, the state of the outside line button which was unoccupied is set to "being used" and the lamps corresponding to appropriate outside line buttons are controlled to wink or flash in each extension telephone apparatus (in steps S309 and S310). Then, the process for an incoming call to each extension telephone apparatus is performed (in step S311).

On the other hand, in the case where there is no unoccupied outside line button, the controller 2 resets the state of the channel which corresponds to the incoming call to the state that no incoming call is being detected and the outside line interface is activated, and then, the process to reject the incoming call is performed (in step S308).

It should be noted that the controller 2 controls each extension telephone apparatus in a manner such that each telephone apparatus has the lamp indication in common. Also, when the telephone communication is completed, the controller 2 sets the state of occupancy of the corresponding outside line button and channel to "being available," then, the lamps of the outside line button in all the extension telephone apparatus are turned off.

In the second embodiment, two outside line buttons correspond to one outside line, however, it is to be understood that the present invention is not limited to the specific embodiment. This restriction can be removed, and it can be set up so that the unoccupied lines and outside line buttons can be accessed by an automatic search between all outside lines and outside line buttons in the system.

Furthermore, in the second embodiment, a lamp is lit up or turned off corresponding to the state of the outside line button (whether or not it is pushed down), however, the state of the channel can be displayed on the LCD, instead of the lamp. Furthermore, a touch panel can be used and the conventional ten key pad is also used as the outside line buttons.

The key telephone apparatus accommodating the ISDN has been described in the second embodiment, however, the present invention can be applied to a key telephone apparatus accommodating analog lines as well as ISDN. For example, in the case where a system accommodates two lines of the ISDN and two lines of the analog network, four outside line buttons for the ISDN can independently correspond to the four channels of the ISDN. On the other hand, the two outside line buttons for the analog network can correspond either one-to-one or independently.

As described above, according to the present embodiment, in the case where there is an arrival of an incoming call which is designated to select the channel 6B1 of the outside line 6, the controller 2 flashes a lamp of the outside line buttons 10-1 or 10-2 which was unlit. In the case where both lamps are lit or flashing, the incoming call is rejected. On the other hand, in the case where only one of these is pushed down, the controller 2 lights the lamp of the button that was pushed down. After that, when a telephone number is inputted by the dial buttons 12 and the start button 13 of the extension telephone apparatus is pushed down, the outgoing call is made through the unoccupied channel either, the communication channel 6B1 or 6B2 of the outside lines 6.

Accordingly, the case that the outgoing call to the second party cannot go through since an incoming call from the third party has arrived before all digits of the number have been depressed and the start button is pushed down is avoided. That is, there is an advantage such that the rate of the conflicts between incoming calls and outgoing calls is reduced and it improves the efficiency in handling calls in a manner such that the logical channels of the outside lines correspond freely to the outside line buttons.

Third Embodiment

Figure 7:
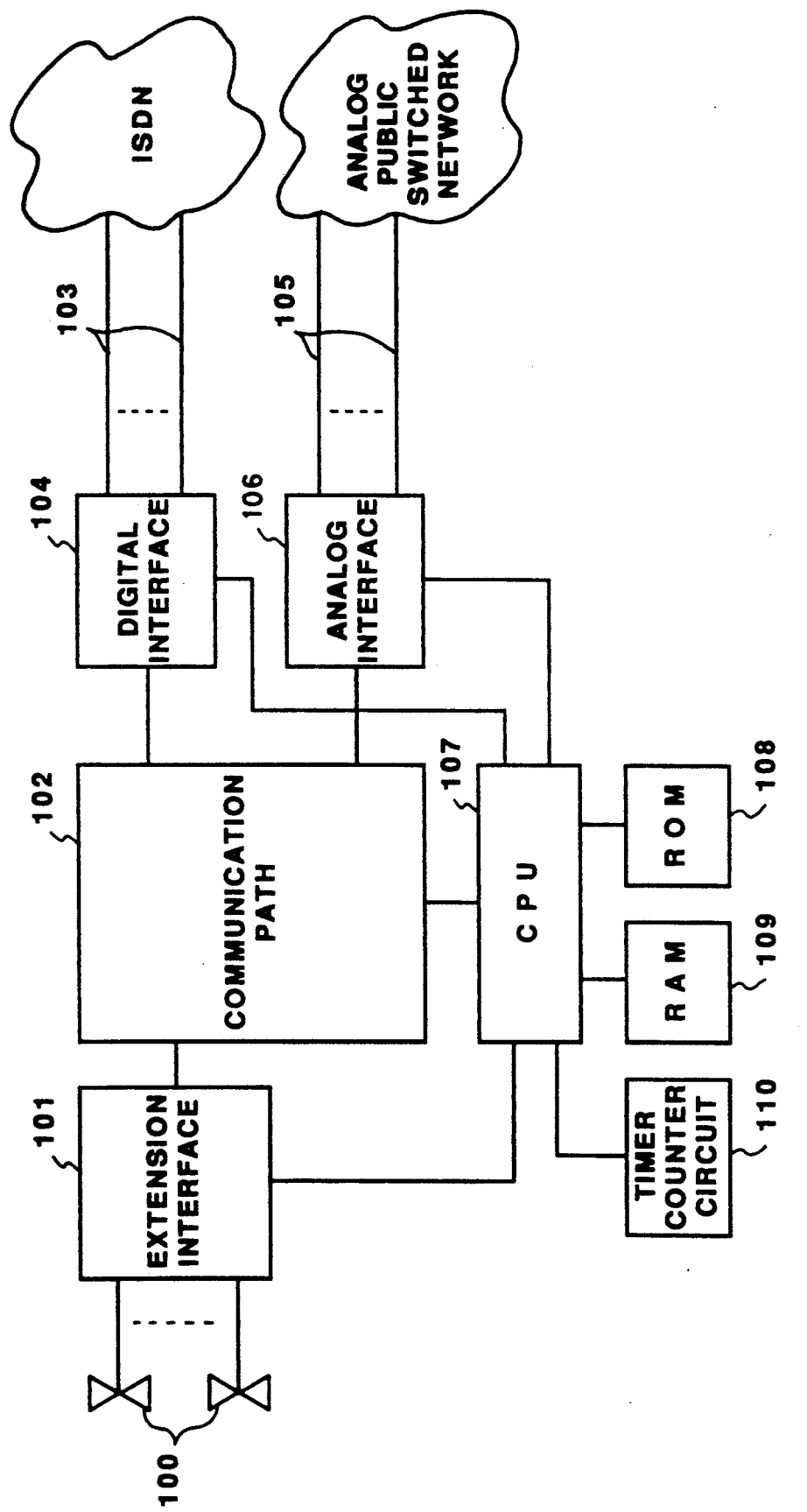
FIG. 7 is a diagram which illustrates the constitution of a key telephone apparatus according to the third embodiment.

FIG. 7 is a diagram which illustrates the constitution of the key telephone apparatus according to the third embodiment. In the drawing, the reference numeral 100 is an extension telephone apparatus comprising the outside line buttons and the like, the reference numeral 101 is an extension interface, and the reference numeral 102 is a communication path. The reference numeral 103 is a digital transmission path, the reference numeral 104 is a digital interface, and the reference numeral 105 is an analog transmission path. The reference numeral 106 is an analog interface, the reference numeral 107 is a central processing unit (CPU), and the reference numeral 108 is ROM which stores control programs. Furthermore, the reference numeral 109 is RAM which stores various kinds of data and the reference numeral 110 is a timer counter circuit.

Figure 8:
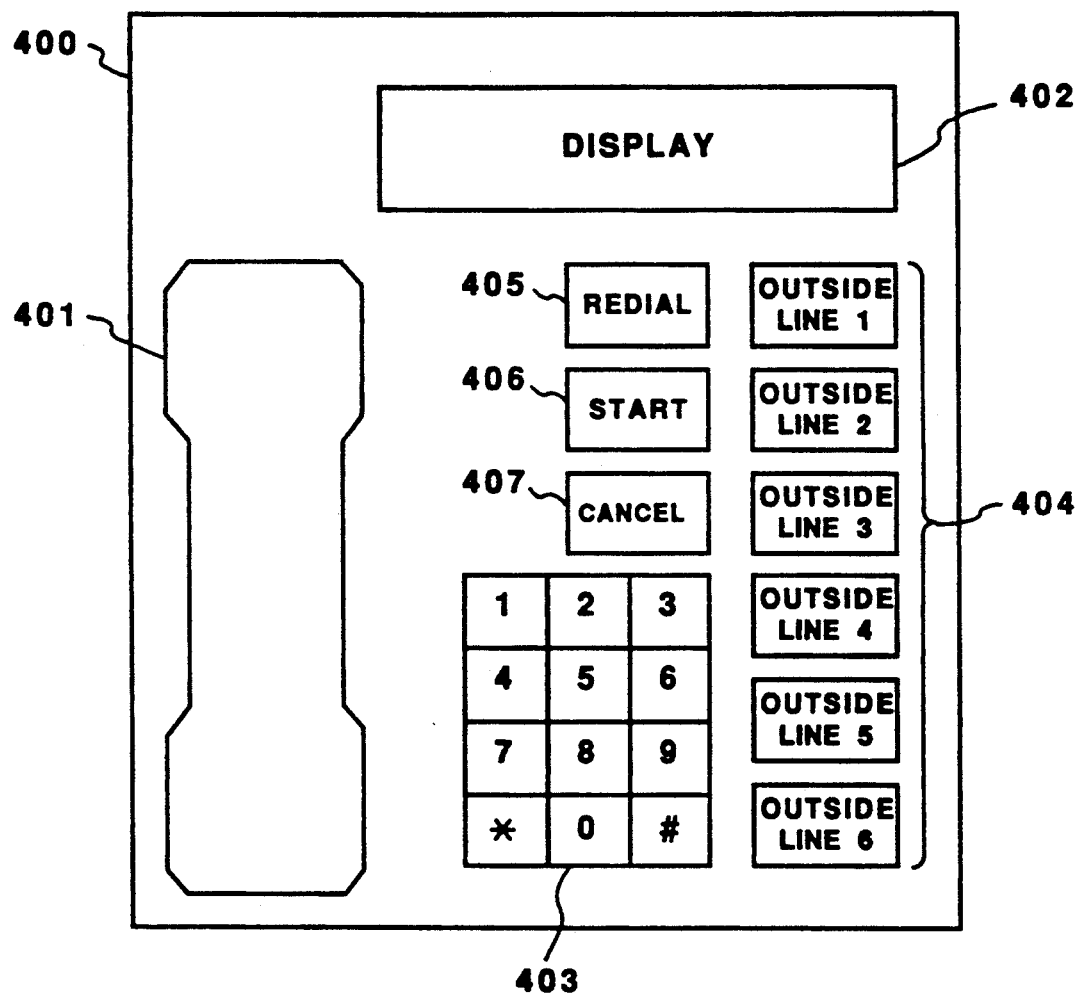
FIG. 8 is a top view of the exterior of the extension telephone apparatus according to the third embodiment.

FIG. 8 is a top view of the exterior of the extension telephone apparatus 100. The reference numeral 400 is the main body of the dedicated extension telephone apparatus, the reference numeral 401 is the handset, and the reference numeral 402 is a display such as an LCD. The reference numeral 403 represents the ten key pad, the reference numeral 404 represents the outside line buttons, and the reference numeral 405 is a redial button. Further, the reference numeral 406 is a start button and the reference numeral 407 is a cancellation button.

FIG. 9 illustrates a part of the data contained in the RAM 109. The reference M500 is a TMRFLG which determines whether a timer counter circuit is activated in case where a call setting is detected in the network during the operation for the outgoing call, and the "0" indicates not to start the timer counter circuit. In order to start the timer counter circuit, the "1" is set in a manner such that the cancellation button 407 is pushed down and the start button 406 is then pushed down in the case where the extension telephone apparatus is idle. On the other hand, to release the setting, the "0" is set in a similar manner. Furthermore, the DGRFLG (dial input start flag) in the area M501 is the area where the "1" is designated to be set when even one digit of the dial number is inputted during the operation for the outgoing call, and the redial operation is cancelled if the DGRFLG is "1". The reference RDLARA 1~n in the area M503 represents areas which store the data for redial. The number of the digits is set in the DGTCNT in the area M502. Further, flags in areas M502 and M503 can be cleared in a manner such that the cancellation button 407 and the redial button 405 of the extension telephone apparatus are pushed down.

Now accompanying the flowcharts of FIG. 10A, FIG. 10B, and FIG. 11, the controlling processes of the key telephone apparatus according to the third embodiment will be described.

Figure 10A:
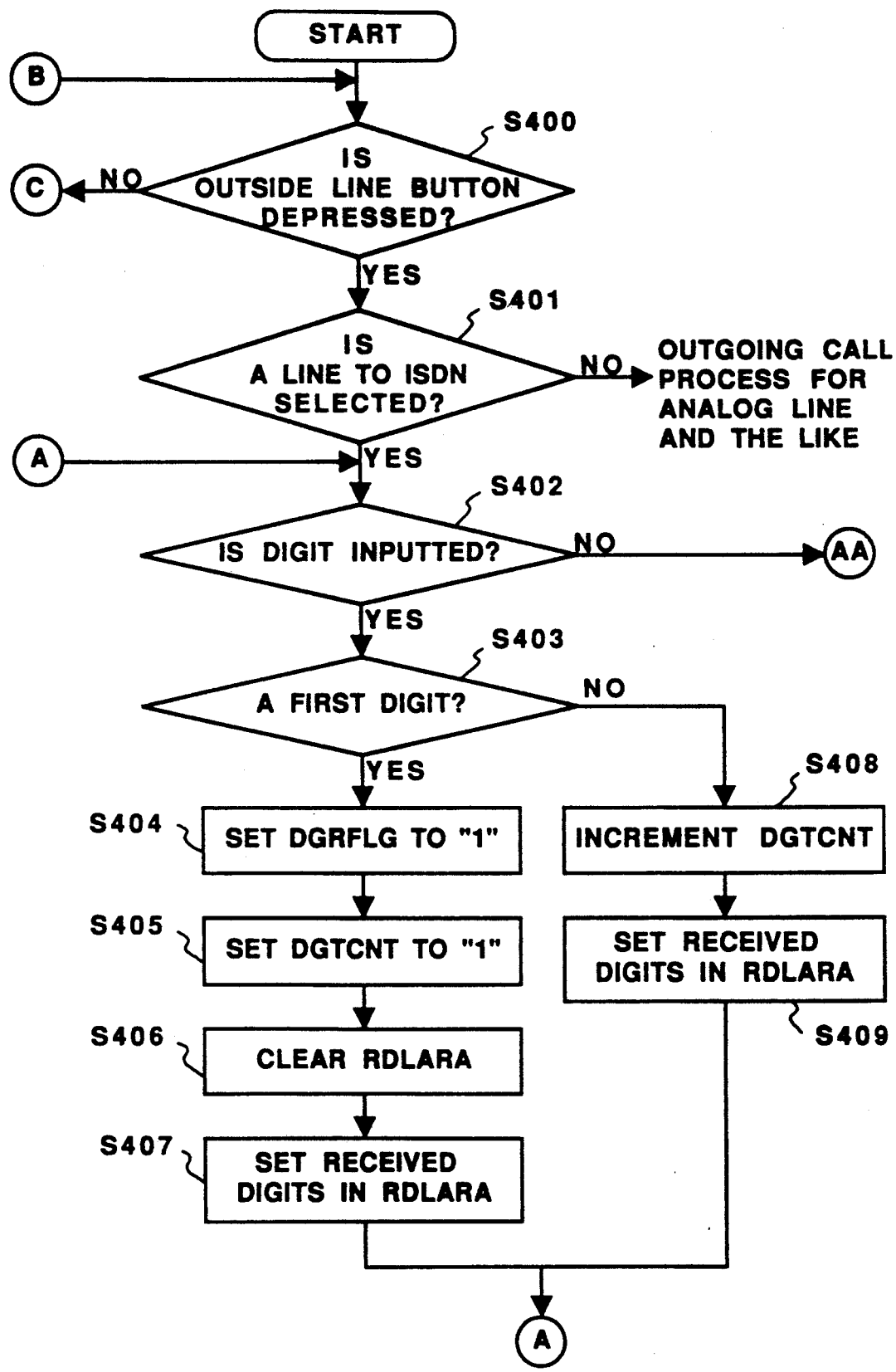
FIG. 10A, FIG. 10B, and FIG. 11 are flowcharts which illustrate the control processing according to the third embodiment.

In step S400 in FIG. 10A, it is discriminated whether or not the CPU 107 has performed the operation to seize an outside line, that is, it is discriminated whether or not the outside line button 404 is pushed down. In the case where the outside line button 404 has been pushed down, it is diagnosed whether or not the selected line is the ISDN line by referring to the RAM 109 in step 401. Otherwise, the process for the outgoing call to the analog lines is performed. The types of the outside lines are registered in the RAM 109 and which outside line (channel) is selected is also stored in the RAM 109.

In the case where the ISDN is selected in step S401, the CPU determines the fact that a number has been inputted in step S402. If YES is rendered in step S402, then the procedure continues to step S403 where whether or not the inputted number is the first digit is tested. That is, it is discriminated by whether or not the DGRFLG in the memory area M501 is "0." It should be noted that the DGRFLG in the memory area M501 is set to "0" when the call has been established and finally the communication is completed.

In the case where the inputted telephone number is the first digit, the DGRFLG in the memory area M501 is set to "1" in step S404 and the DGTCNT in the memory area M502 is set to "1" in step S405. The RDLARA 1~n in the memory area M503 are all cleared in step S406 and the inputted first digit is set in the RDLARA 1 in step S407.

For on and after the second digit, the DGTCNT in the memory area M502 is added 1 in step S408. In step S409, the received digits are stored in order in the predetermined area of the RDLARA which is indexed by the value of the DGTCNT.

The CPU 107 displays each digit of the telephone number on the display 402 every time the digit of the dial number is inputted from the ten key pad 403.

Further, the CPU 107 waits until the start button 406 is pushed down in step S410. When the operator finishes inputting the dial number and the start button 406 is pushed down, the DGRFLG is referred to in step S411. If the flag of the DGRFLG is "0", it is discriminated that there is no dial input and ignored that the start button 406 is pushed down, and the process returns to step S402.

On the other hand, when the flag of the DGRFLG is "1" (this shows that there is a dial input), the TMRFLG (a flag indicating the occurrence of a conflict between an out going call and an incoming call) is referred to in step S412. If the flag is "1", the timer counter circuit 110 is activated. If the TMRFLG is "0", the CPU 107 ignores the timer counter circuit 110 and the process proceeds to step S414.

In the case where the CPU 107 detects the time expiration from the timer counter circuit 110 or the timer counter has already expired in step S413, elements of information for transmitting a call set-up are edited in step S414. Then, the call set-up is transmitted to the ISDN through the digital interface 104 in step S415 and the process proceeds to a state where a response from the other party is being waited.

Further, in step S420, in the case where the CPU 107 detects that the redial button is pushed down, the DGRFLG is referred in step S421. If the flag of the DGRFLG is "1", the operation for the redial is cancelled and the process returns to step S402. On the other hand, if the DGRFLG is "0", the DGTCNT is referred to by the CPU 107 in step S422. If the DGRFLG is "0", it is diagnosed that the operation for a cancellation of the redial should be performed and the process returns to step S402.

On the other hand, in the case where the DGTCNT is not "0", it indicates that there exists redial data, therefore, the process proceeds to step S412 as in the case that the start button 406 has been pushed down.

The CPU 107 at this point reads the telephone number for the redial out of the RDLARA and displays the dial number on the display 402. Then, it is checked whether or not the timer is being counted which counts up until the network ignores the call set-up for an outgoing call. In step S413, in the case where the time is up or the time has been already up, the CPU 107 reads out the telephone number stored in the RDLARA and transmits the call set-up (i.e., a transmission of a call set-up acceptance).

Figure 11:
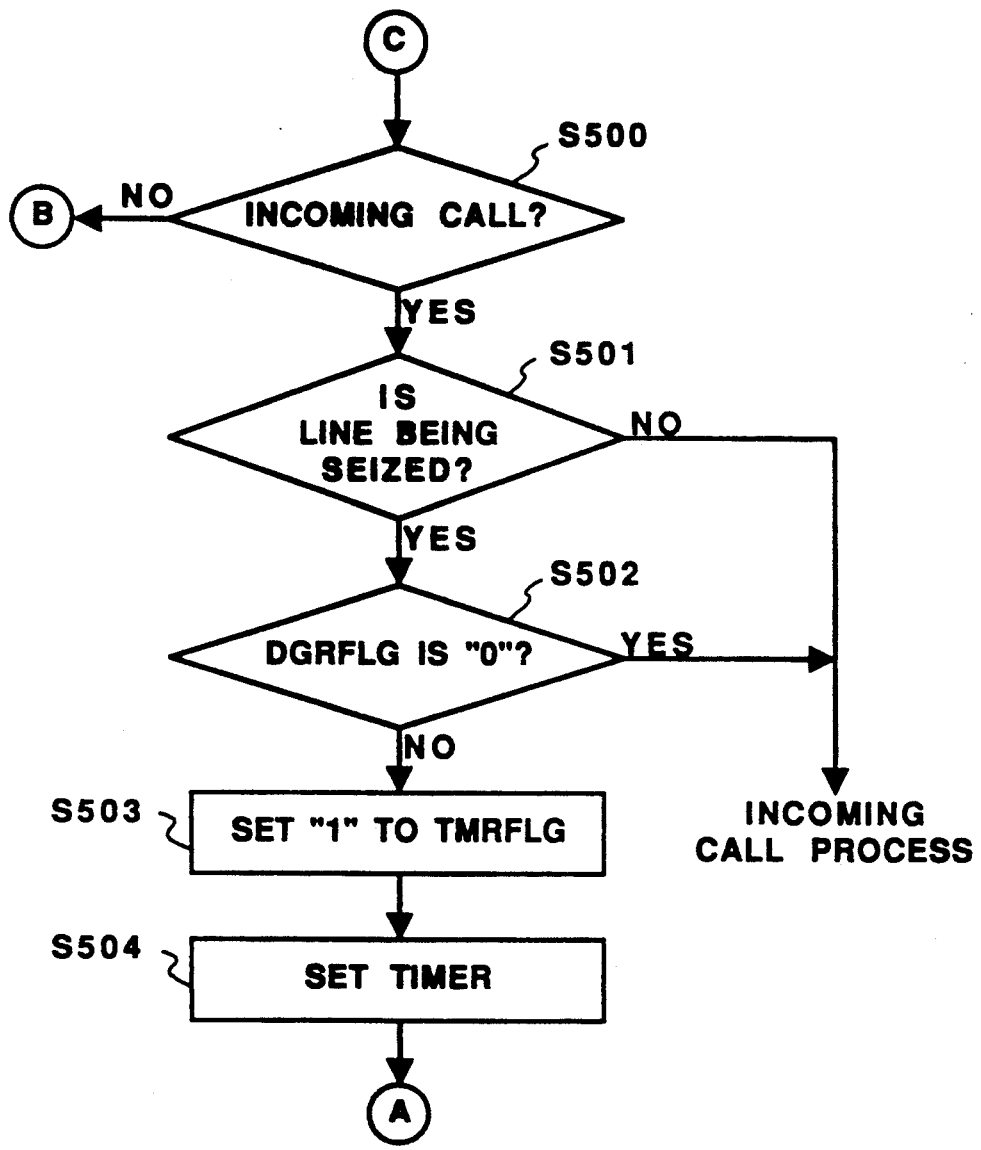

On the other hand, in step S500 in FIG. 11, in the case where there is an arrival of an incoming call from the ISDN, it is checked whether or not the channel where the incoming call arrived is being selected by the extension telephone apparatus for an outgoing call (whether or not the outside line buttons 404 are pushed down). If the channel is not being selected, the conventional operation for the incoming call is performed.

If the channel is being selected, the DGRFLG is checked in step S502. Then if the DGRFLG is "0", which indicates no digit is inputted, the operation for the outgoing call is interrupted and the conventional operation for the incoming call is performed.

It is permissible to adopt an arrangement in which the CPU 107 ignores the DGRFLG and waits for the reception of the telephone number or the depression of the redial button at this point. That is, it is possible to modify the above-mentioned process where the CPU 107 ignores the incoming call if the extension or the channel is merely selected at the time when the incoming call is being arrived.

Furthermore, an arrangement can be adopted in which the CPU 107 discriminates the DGTCNT in step S502 and the following process can be branched off. That is, it is possible to ignore the incoming call in the case where the number of digits already inputted has reached a predetermined number of digits (i.e., the number is one or two).

In step S502, in the case where the DGRFLG is determined to be "1", which indicates that there exists the dial input for one or more than one digit, the call set-up for the incoming call is not responded to (i.e., a transmission of the call set-up acceptance is not performed) and the process proceeds to step S503. Under this condition, the ISDN is waiting for time expiration and the call set-up for the outgoing call in this period is ignored.

Therefore, the CPU 107 sets the TMRFLG to "1" and the timer counter circuit 110 is started in step S504. At this time, a period of time to be set for the counter circuit 110 is longer than the time the ISDN ignores the call set-up from the present system. On the other hand, in the case where the timer counter circuit 110 has been already set in step S504, the timer counter circuit 110 is started again after it is reset. This is to avoid the incoming call from the ISDN comes in again when the timer waiting for a response from the present system which has received the call from the ISDN, runs out.

The process now returns to step S402 where the process for reading out the dial number is continued.

Figure 10B:
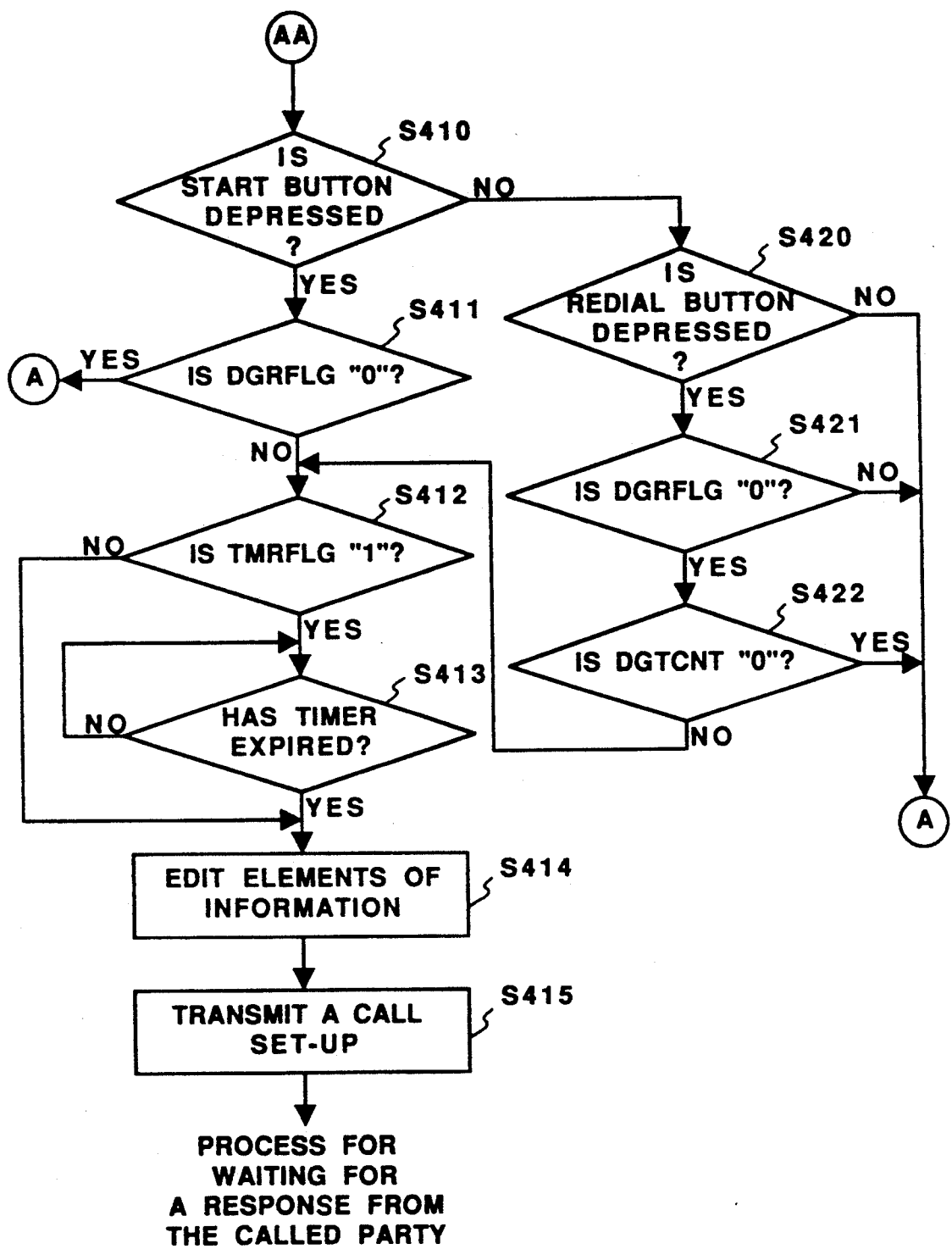

It should be noted that the time out of the timer counter circuit 110 set in step S504 is detected in the step S213 in FIG. 10B.

Furthermore, in the case where the start button 406 is pushed down following the redial button 405, the CPU 107 ignores the depression of the start button 406 since the DGRFLG is "0".

The operation for the redial in the third embodiment has been described above. It should be understood that the present invention can be applied to the operation for abbreviated dials. That is, in the case where the first digit (or can be the second digit) of the abbreviated telephone number is inputted from the ten key pad 403, the CPU 107 is able to ignore the incoming call and not to respond to the call after that. Then, when the abbreviated number of the predetermined digit is inputted, the CPU 107 reads out the telephone number from the RAM without waiting the input of the start button 406 and transmits the call set-up information from the digital interface 104.

The operation for one-touch dial is the same as that for the redial. In this case, the abbreviated dial numbers and the one-touch dial numbers are previously stored in the RAM 109 by the ten key pad 403.

The information stored in the RAM 109 is not limited to the information from the ten key 403. The information which indicates that the start button 406 is pushed down can be also stored in the RAM 109.

That is, the CPU 107 writes a code which indicates that the start button 406 is pushed down in the RDLARA in the RAM 109 when the start button 406 is pushed down following the input of dial numbers by the ten key pad 403. This can be also applied to the registration of the abbreviated dial numbers and the one-touch dial numbers.

In the case where the redial button 405 or the one-touch dial button (not shown) is pushed down, or the abbreviated number is inputted by the ten key pad 403, the CPU 107 reads out the dial number and the code of the start button 406 from the RAM 109.

When the CPU 107 reads out the code, the call set-up is transmitted by the digital interface 104 similarly to the case when the start button 406 is pushed down for conventional dialling (except the redial, the one-touch dial, or the abbreviated dial).

In the above description, the present invention is applied to the key telephone system. However, the present invention can be also applied to an independent digital telephone apparatus capable of connecting to the ISDN. In this case, an internal controller of the telephone apparatus performs a control based on key inputs and contents of an internal memory. Further, the channel capable of connecting to the ISDN can be single or plural.

Furthermore, the present invention is not limited to the ISDN and can be applied, for example, to the case where a dial signal is transmitted to a digital network locally constructed in a corporation.

In accordance with the present invention, the interruption of an outgoing call due to an incoming call is avoided when the telephone number is being inputted, and thus, the efficiency of the operation is improved.

In addition, in the above case a dialling error can be avoided because the telephone number storage process is consecutively performed.

Furthermore, a call is steadily established because the dial signal is transmitted after the predetermined period has ended.

As many apparently widely different embodiments of the present invention can be made without departing from the spirit and scope thereof, it is to be understood that the invention is not limited to the specific embodiments thereof, except as defined in the claims.

What is claimed is:

1. A communication apparatus accommodating a plurality of analog communication lines and a plurality of communications terminals, comprising:

detection means for detecting incoming calls to said analog communication lines;

selection means for selecting a first unoccupied analog line in the plurality of analog lines; and calling means for sending a call onto the first analog communication line selected by said selection means based on a request from one of the communication terminals, wherein said selection means selects a second unoccupied analog communication line and said calling means calls through the second unoccupied analog communication line, in the case where said detection means detects an incoming call to the first analog communication line which was selected by said selection means.

2. The communication apparatus according to claim 1, wherein said detection means detects each incoming call based on a polarity reversal of an analog communication line or a call signal.

3. The communication apparatus according to claim 1, wherein said selection means informs the detected incoming call to all communication terminals other than the communication terminals which have made a request for an outgoing call, in the case where said detection means detects the incoming call to the first analog communication line.

4. A communication apparatus accommodating a plurality of communication channels and a plurality of communication terminals, comprising:

first detection means for detecting a request for an outgoing call from any of the communication terminals to the plurality of channels;

second detection means for detecting which of the channels are being used in the plurality of channels;

third detection means for detecting incoming calls to the plurality of the communication channels;

means for calculating a sum of the number of the communication channels in which a request for an outgoing call is detected by said first detection means and the number of the communication channels which are detected as being used by the second detection means; and means for rejecting an incoming call detected by said third detection means in the case where the sum is at least equal to a predetermined number and for calling unused ones of the communication terminals in the case where the sum is less than the predetermined number.

5. A communication apparatus accommodating a plurality of communication channels and a plurality of communication terminals, wherein the plurality of communication terminals have a plurality of selection keys corresponding to a plurality of displays, comprising:

first detection means for detecting key inputs by the plurality of selection keys;

second detection means for detecting incoming calls to the plurality of channels;

selection means for selecting ones of the plurality of displays corresponding to the key inputs detected by said first detection means; and control means for controlling the plurality of displays corresponding to a selection by said selection means;

wherein, the case where an incoming call is detected by said second detection means, said control means controls one of the plurality of displays which is not selected by said selection means to perform a predetermined display, and wherein said control means rejects the incoming call in the case where all the plurality of displays are selected.

6. A communication apparatus accommodating a plurality of communication lines and plurality of communication terminals, wherein said plurality of communication terminals have selection keys corresponding to each communication line to selected the plurality of communication lines and a display corresponding to each communication line, comprising:

first detection means for detecting key input by the selection keys;

second detection means for detecting incoming calls to the plurality of lines; and control means for controlling the displays corresponding to each state of the key input by the selection keys;

wherein, the case where an incoming call is detected by said second detection means and one of the displays has no indication, said control means changes the display which had no indication to a predetermined display state, while said control means rejects the incoming call in the case where all the displays are under the predetermined display state.

7. A communication apparatus accommodating a plurality of communication lines and a plurality of communication terminals, each of the plurality of communication lines comprising a plurality of logical channels, and said plurality of communication terminals having selection keys corresponding to each communication line to select the plurality of communication lines;

wherein each of said plurality of logical channels can be independently set to correspond to an actuated one of said selection keys, and, in case of an outgoing call by one of said communication terminals on one of said communication lines, the selection key of the communication terminal actuated for making the outgoing call is set to correspond to an unoccupied channel of the logical channels, while an unused selection key is set to correspond to a logical channel designated in response to an incoming call to said communication line.

8. A communication apparatus comprising:
input means for inputting a number specifying a called party for an outgoing call;
detection means for detecting an incoming call; and
suppressing means for suppressing a response to the incoming call in the case where the incoming call is detected while the number for the outgoing call is being inputted.

9. The communication apparatus according to claim 8, wherein said suppressing means has storage means for storing the number specifying the called party and continues storing the number in said storage means even if the incoming calls is detected.

10. A communication apparatus comprising:
input means for inputting a number specifying a called part for an outgoing call;
detection means for detecting an incoming call; and
control means for performing a control so that the number is transmitted after a predetermined period of time has passed in the case where an incoming cell is detected while the number for the outgoing call is being inputted.

11. The apparatus according to claim 4, wherein said third detection means detects an incoming call from an ISDN line.

12. The apparatus according to claim 4, wherein the predetermined number is the number of said communication lines.

13. The apparatus according to claim 5, wherein said second detection means detects an incoming call from an ISDN line.

14. The apparatus according to claim 6, wherein said second detection means detects an incoming call from an ISDN line.

15. The apparatus according to claim 7, wherein the plurality of communication lines include an ISDN line.

16. The apparatus according to claim 8, wherein said detection means detects an incoming call from an ISDN line.

17. The apparatus according to claim 8, wherein said suppressing means suppresses the response by transmitting the number which specifies the called party after a predetermined period of time has passed after the incoming call is detected.

18. The apparatus according to claim 8, wherein said suppressing means transmits the number to communication lines.

19. The apparatus according to claim 10, wherein said control means performs the control so that the number is transmitted after the predetermined period of time has passed after the arrival of the incoming call is detected.

20. The apparatus according to claim 10, wherein said detection means detects an incoming call from an ISDN line.

21. The apparatus according to claim 10, wherein said control means transmits the number to communication lines.

* * * * *

UNITED STATES PATENT AND TRADEMARK OFFICE
CERTIFICATE OF CORRECTION

PATENT NO. : 5,251,254
DATED : October 5, 1993
INVENTOR(S) : YOSHIHIRO TANIGAWA, ET AL.          Page 1 of 2

It is certified that error appears in the above-identified patent and that said Letters Patent is hereby corrected as shown below:

COLUMN 1

Line 18, "either one" should read --either selects one--.
   Line 19, "down, the" should read --down, or the--.

COLUMN 2

Line 12, "line, in" should read --line and the calling means calls through another occupied line, in--.

COLUMN 5

Line 11, "resource 15" should read --source 15--.
   Line 66, "even" should read --even if--.

COLUMN 7

Line 67, "channel either," should read --channel, either--.

COLUMN 10

Line 68, "step S213" should read --step S413--.

COLUMN 12

Line 6, "communications" should read --communication--.
   Line 27, "the" should read --of a--.

COLUMN 13

Line 4, "wherein, the" should read --wherein, in the--.
   Line 25, "wherein, the" should read --wherein, in the--.

UNITED STATES PATENT AND TRADEMARK OFFICE
CERTIFICATE OF CORRECTION

PATENT NO. : 5,251,254

DATED : October 5, 1993

INVENTOR(S) : YOSHIHIRO TANIGAWA, ET AL.

It is certified that error appears in the above-identified patent and that said Letters Patent is hereby corrected as shown below:

COLUMN 14

Line 9, "calls" should read --call--.
    Line 12, "part" should read --party--.

Signed and Sealed this

Seventh Day of June, 1994

Attest:

BRUCE LEHMAN

Attesting Officer     Commissioner of Patents and Trademarks